US008654701B2

(12) United States Patent
Kazmi et al.

(10) Patent No.: US 8,654,701 B2
(45) Date of Patent: Feb. 18, 2014

(54) CREATION AND SIGNALLING OF UE LISTS TO SUPPORT FREQUENCY SELECTIVE REPEATER OPERATION

(75) Inventors: Muhammad Kazmi, Bromma (SE); Jiansong Gan, Beijing (CN); Robert Baldemair, Solna (SE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 781 days.

(21) Appl. No.: 12/580,340

(22) Filed: Oct. 16, 2009

(65) Prior Publication Data

US 2010/0120397 A1  May 13, 2010

Related U.S. Application Data

(60) Provisional application No. 61/114,307, filed on Nov. 13, 2008.

(51) Int. Cl.
*H04B 7/185* (2006.01)
(52) U.S. Cl.
USPC ........... 370/318; 370/315; 370/317; 370/328; 455/13.4; 455/7
(58) Field of Classification Search
None
See application file for complete search history.

(56) References Cited

U.S. PATENT DOCUMENTS

2008/0244148 A1* 10/2008 Nix et al. .................. 710/313
2009/0286510 A1* 11/2009 Huber et al. .............. 455/410
2009/0288140 A1* 11/2009 Huber et al. .................. 726/2

OTHER PUBLICATIONS

Ericsson "A Discussion on Some Technology Components for LTE-Advanced" TSG-RAN WG1 #53, May 5-9, 2008, Kansas City, MO USA R1-082024.
Panasonic "Discussion on the Various Types of Relays" 3GPP TSG RAN WG1 Meeting #54, Jun. 30-Jul. 4, 2008, Warsaw, Poland R1-082397.

* cited by examiner

*Primary Examiner* — Ian N Moore
*Assistant Examiner* — Jackie Zuniga Abad (57) ABSTRACT

A method of supporting frequency-selective repeaters (eNodeRs) in a wireless telecommunication system. A base station (eNodeB) classifies User Equipments (UEs) into two categories or lists of users: a white list containing UEs that may need the assistance of repeaters, and a black list containing UEs that do not need repeater assistance. The eNodeB transmits one of these two lists to the eNodeRs. The eNodeRs do not amplify resource blocks (RBs) scheduled for black list UEs. Each repeater may decide on its own whether to amplify signals for a non-black list UE by measuring signals from the UE and comparing them with predefined criteria.

15 Claims, 6 Drawing Sheets

CREATION AND SIGNALLING OF UE LISTS TO SUPPORT FREQUENCY SELECTIVE REPEATER OPERATION

CROSS-REFERENCE TO RELATED APPLICATIONS

This application claims the benefit of U.S. Provisional Application No. 61/114,307 filed Nov. 13, 2008.

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND

The present invention relates to wireless telecommunication systems. More particularly, and not by way of limitation, the invention is directed to a method of supporting frequency-selective repeaters in a wireless telecommunication system.

The following acronyms are used in the description herein:
3GPP Third Generation Partnership Project
BS Base Station
CQI Channel Quality Indicator
DL Downlink
DoA Direction of Arrival
E-UTRAN Evolved UMTS Radio Access Network
FDMA Frequency Division Multiple Access
FS Frequency-Selective
LTE Long Term Evolution
MAC Medium Access Control
MME Mobility Management Entity
OFDM Orthogonal Frequency Division Multiplexed
OFDMA Orthogonal Frequency Division Multiple Access
PDCCH Physical Downlink Control Channel
PH Power Headroom
PUCCH Physical Uplink Control Channel
PUSCH Physical Uplink Shared Channel
RACH Random Access Channel
RB Resource Block
RS Reference Signals
RSRP Reference Signal Received Power
RSRQ Reference Signal Received Quality
Rt_BS Uplink Received Signal Strength Threshold at Base Station
Rx Uplink Received Signal Strength
RTT Round Trip Time
SAE System Architecture Evolution
S-GW Serving Gateway
SRS Sounding Reference Signal
UE User Equipment
UMTS Universal Mobile Telecommunication System
X2 Interface between eNodeBs
Un Interface between eNodeB and eNodeR (formerly X3)

In 3GPP, work is ongoing on the Long Term Evolution (LTE)-Advanced effort. In the LTE-Advanced network, relays will be used to enhance coverage and increase data rate in cell borders without increasing the number of conventional base station (BS) sites. Layer 1 relays, also referred to as advanced repeaters, are one of the potential technology components of LTE-Advanced. The main difference between an advanced repeater and a conventional repeater is that the advanced repeater includes one or several advanced functions, such as advanced antenna processing and/or frequency-selective (FS) amplification. Despite the use of advanced functions, repeaters are considered to be simpler than L2/L3 relays, since the data signal is not detected and decoded but only amplified and forwarded.

Figure 1:
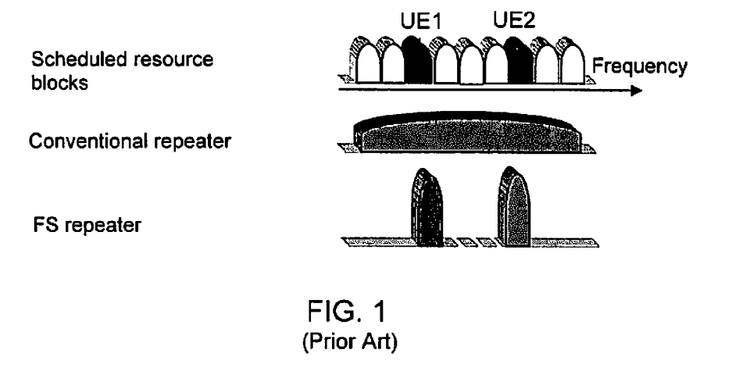
FIG. 1 (Prior Art) is an illustrative drawing showing the basic principle of conventional FS repeater operation.

FIG. 1 is an illustrative drawing showing the basic principle of conventional FS repeater operation. It is assumed in this illustration that UEs are scheduled such that each user occupies a part of the entire bandwidth. Among these UEs, UE1 and UE2 are associated with the same repeater and others are not associated with this repeater. If the repeater is a conventional repeater, it amplifies the entire bandwidth regardless of how the users are scheduled. If the repeater is an FS repeater, it only amplifies the resource blocks (RBs) allocated to UE1 and UE2. FS repeaters are particularly beneficial in Frequency Division Multiple Access (FDMA) systems—e.g. Orthogonal Frequency Division Multiple Access (OFDMA)—where typically only part of the cell bandwidth (a sub-set of the resource blocks) is used by one UE at a time. The repeater can only amplify this part of the allocated bandwidth provided that an association exists between the UE and the repeater.

In LTE and LTE-Advanced networks, scheduling is modeled in the Medium Access Control (MAC) layer and is performed by a scheduler residing in the radio network node such as base station or eNodeB or Node B. The scheduler assigns RBs for the downlink (assignments) as well as for the uplink (grants) and transmits them together with a UE identifier using the downlink control channel such as the Physical Downlink Control Channel (PDCCH). To assist downlink scheduling decisions in the eNodeB, the mobile terminal or User Equipment (UE) can be configured to transmit downlink channel state information (CSI) such as Channel Quality Indicator (CQI) reports on a configured uplink control channel or resource such as the Physical Uplink Control Channel (PUCCH) or on a dedicated or shared channel or resource such as the Physical Uplink Shared Channel (PUSCH). CQI reports are typically based on some sort of downlink pilot or reference signal such as a downlink common reference signal (CRS). The uplink channel-dependent scheduling is typically based on the quality measured by the eNode B on some sort of uplink pilot or reference signal such as Sounding Reference Signals (SRS). The scheduler uses the reported CQI information to perform fast channel dependent link adaptation and to change allocations in the time and frequency domains.

Repeaters can get the assignments and grants by listening to the downlink control channel such as the PDCCH. In general, an FS repeater would be required to listen to any control channel that carries scheduling information. Besides acquiring the scheduling information, the UE-repeater association relationships are needed in order for the FS repeater to work properly. A repeater that is associated with a particular UE only amplifies the signals transmitted towards the associated UE or from the associated UE to the base station.

There are three known alternatives for establishing the UE-repeater association relationships:

Alternative 1: UEs measure on the reference signal (RS) from both the eNodeB and the repeater and report the measurements to the eNodeB. Based on these reports, the eNodeB establishes an association relationship between a UE and a repeater. An underlying assumption is that repeaters transmit their own reference signals to enable downlink measurements to be identified.

Alternative 2: UEs transmit UL channel soundings. Repeaters measure the channel soundings and report the measurements to the eNodeB. The eNodeB uses the reports to establish the UE-repeater association.

Alternative 3: An implicit association is made using traditional measurements such as the Channel Quality Indicator (CQI) and/or neighbor cell measurements (for example, RSRP, RSRQ, and the like). Repeaters simply amplify and forward these reported measurements to the eNodeB, which uses these reported measurements to establish the UE-repeater association.

SUMMARY

Each of the three conventional alternatives for establishing the UE-repeater association relationships suffers from disadvantages. Alternative 1 requires the repeater to transmit an RS, which impacts the LTE standard and also creates backward-compatibility problems. Another disadvantage is that it increases the signaling overhead. Furthermore, the UE has to synchronize, identify, and perform measurements from multiple repeaters and the eNodeB, thus increasing the UE complexity.

Alternative 2 creates a considerable burden in terms of control signaling and reporting because each repeater must report its measurement results, and the BS or eNodeB decides the association relationships between the UEs and the repeaters and informs each repeater about its relationship.

Alternative 3 is unreliable because there are errors and delays in CQI reporting, and consequently the interference situation is different in the CQI state and the data transmission state. These differences may lead to the establishment of inappropriate UE-repeater associations.

The present invention provides a method of supporting frequency-selective repeaters, which overcomes the shortcomings of the prior art. In an embodiment of the present invention, the BS or eNodeB classifies UEs into two categories or lists of users: a white list containing UEs that may need the assistance of repeaters, and a black list containing UEs that do not need repeater assistance. The eNodeB may broadcast one of these two lists depending on the number of UEs in each list. For example, if 90 percent of the UEs are on the black list, it is more efficient to transmit the black list. However, if 90 percent of the UEs are on the white list, it is more efficient to transmit the white list. The eNodeB should inform the repeaters which list is being broadcast. Each repeater then decides on its own whether to amplify signals for a given UE by listening to the broadcast information from the eNodeB and measuring signals from the UE.

In one embodiment, the present invention is directed to a method of supporting frequency-selective repeaters in a wireless telecommunication system having a base station that serves a plurality of UEs and one or more frequency-selective repeaters that amplify and forward signals between the base station and a portion of the UEs. The method includes the steps of identifying by the base station, UEs for either a black list that identifies UEs for which signals are not to be amplified by a given repeater or a white list that identifies UEs for which signals are allowed to be amplified by the repeater; and ending the black list or white list from the base station to the repeater. The method also includes detecting by the repeater, an identity of a UE within the repeater's transmission range; determining whether the detected UE is on the black list or white list; and when the UE is on the black list, determining by the repeater that signals scheduled for the UE are not to be amplified. When the UE is on the white list, the repeater determines whether to amplify signals scheduled for the UE. The repeater may amplify signals for all white list UEs, or it may apply additional criteria.

In another embodiment, the present invention is directed to a base station for supporting frequency-selective repeaters in a wireless telecommunication system, wherein the base station serves a plurality of UEs, and a frequency-selective repeater amplifies and forwards signals between the base station and a portion of the UEs. The base station includes a UE classifier for identifying UEs that either require or do not require amplification by the repeater; and an interface unit for notifying the repeater of the identified UEs. The UE classifier may place the UEs on either a black list that identifies UEs for which signals are not to be amplified by the repeater or a white list that identifies UEs for which signals are allowed to be amplified by the repeater In another embodiment, the present invention is directed to a frequency-selective repeater in a wireless telecommunication system for amplifying and forwarding signals between a base station and a plurality of UEs served by the base station. The repeater includes an interface unit for receiving a list of UEs from the base station; and means for amplifying and forwarding signals only to UEs identified by the received list. The repeater may include a list analyzer for determining whether the received list is a black list that identifies UEs for which signals are not to be amplified by the repeater or a white list that identifies UEs for which signals are allowed to be amplified by the repeater; and a UE classifier for determining which white list UEs should have their signals amplified.

BRIEF DESCRIPTION OF THE SEVERAL VIEWS OF THE DRAWING

In the following section, the invention will be described with reference to exemplary embodiments illustrated in the figures, in which.

DETAILED DESCRIPTION

Figure 2:
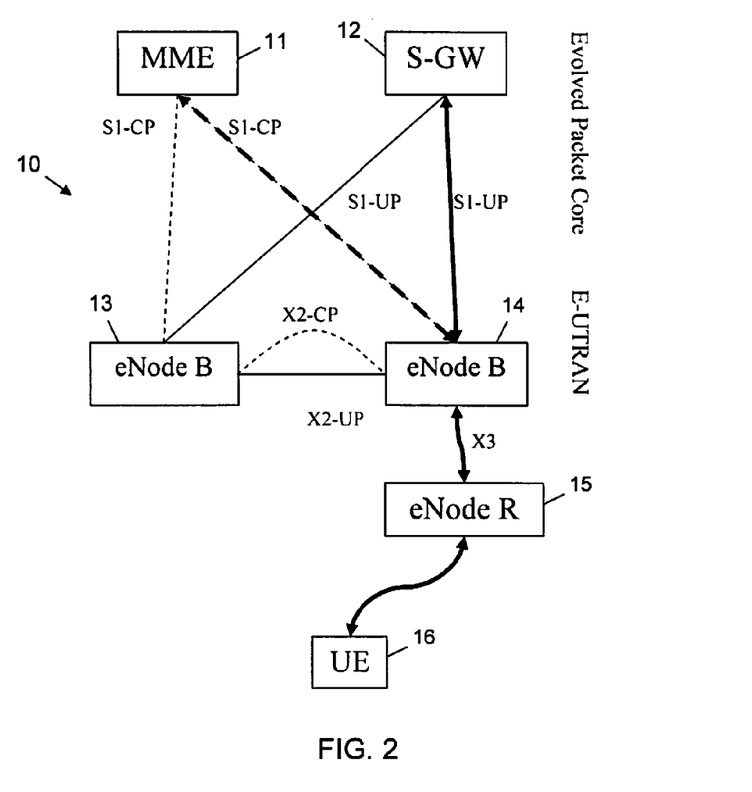
FIG. 2 is a simplified block diagram of a portion of an LTE/SAE network architecture suitable for implementing the system of the present invention.

FIG. 2 is a simplified block diagram of a portion of an LTE/SAE network architecture 10 suitable for implementing the system of the present invention. The Evolved Packet Core within the SAE core network portion of the architecture includes a Mobility Management Entity (MME) 11 and a Serving Gateway (S-GW) 12. The LTE access portion of the architecture includes a plurality of eNodeBs 13 and 14. An advanced repeater, eNodeR 15, interfaces with the eNodeB 14 utilizing an Un interface for transmission of data and for the eNodeB to configure the eNodeR. A UE 16 communicates with the network through the repeater, eNodeR 15.

In one embodiment, the BS or eNodeB 14 provides a black list of UEs to the eNodeR 15. UEs belonging to the black list are considered to have good enough signal quality with respect to the eNodeB (for example, signal quality above a predefined threshold level) and hence do not need the assistance of a repeater. Therefore, the eNodeR does not amplify RBs scheduled to these UEs (i.e., in the black list). The eNodeR may amplify RBs scheduled to a UE that is not on the black list.

Alternatively, the BS or eNodeB 14 provides a white list of UEs to the eNodeR 15. UEs belonging to the white list are considered to have poor signal quality with respect to the eNodeB (for example, signal quality below the predefined threshold level) and hence need the assistance of a repeater. Therefore, the eNodeR should amplify RBs scheduled to these UEs (i.e., in the white list) if the eNodeR can provide good enough signal strength to these UEs.

In various embodiments, the eNodeB may create and monitor the black list or white list of UEs using one or more of the algorithms described below. The eNodeB continuously updates the lists triggered whenever new UEs enter the system (initial access or via handover), radio conditions of existing UEs change due to mobility, or existing UEs leave the system.

In one embodiment, the eNodeB creates the black/white lists based on uplink received signal strength level. For example, the eNodeB places a given UE on the black list if the uplink received signal power level (Rx) or quality from the given UE is above a predefined threshold level (Rt_BS). At this signal strength level, the UE can be well served directly by the eNodeB and does not require amplification by the eNodeR. Alternatively, the eNodeB may place the given UE on the white list if the uplink received signal power level (Rx) or quality from the given UE is below a predefined threshold level (Rt_BS). The Rx level may be measured by the eNodeB during initial access (RACH) or on any other channel during operation.

In another embodiment, the eNodeB creates the black/white lists based on the round trip time (RTT) of a signal from the eNodeB to the UE and back. If the round trip time is less than a predefined threshold (i.e., RTT<RTT_t_BS), the eNodeB places the UE on the black list. A lower value of RTT means the UE is close to the eNodeB and can be well served directly by the base station without repeater intervention. Alternatively, the eNodeB may place the given UE on the white list if the RTT is greater than a predefined threshold. The eNodeB may measure the RTT during the RACH transmission or during the call.

In another embodiment, the eNodeB creates the black/white lists based on an estimated direction of arrival (DoA). By estimating the DoA of signals from each UE, the eNodeB can create different black lists (or white lists) for different eNodeRs. This is because the eNodeB knows the position of each eNodeR with respect to itself, and thus can identify UEs operating in the direction of each eNodeR. This method enables the creation of more accurate black/white list(s) since they can be specific to each eNodeR in the vicinity of the serving eNodeB.

In another embodiment, the eNodeB creates the black/white lists based on downlink measurements. The measurements are performed by the UE on the pilot or reference signals transmitted by the eNodeRs and the eNodeB. This embodiment assumes that the eNodeRs transmit their own pilot signals. The UE reports these measurements to the eNodeB. The eNodeB then utilizes these reported measurements to create the black/white lists. Since the UE measurements are performed on multiple eNodeRs, the eNodeB can create repeater-specific black/white lists. It should be noted that although this embodiment utilizes eNodeR pilot signals, other embodiments of the present invention do not require that the eNodeRs transmit pilot signals in order to create the black/white lists.

In another embodiment, the eNodeB creates the black/white lists based on UE transmit power. The UE reports its transmitted power or power headroom (PH) to the network. The PH is the difference between the UE maximum output power and the UE transmitted power measured in the decibel (dB) scale. PH can also be expressed in the linear scale in which case it is the ratio of the UE maximum output power to the UE transmitted power. Generally PH is measured and reported by the UE to the base station in the dB scale. A smaller PH value means the UE is transmitting with a higher power level. Alternatively, a larger PH value means the UE is transmitting with a lower power level.

The eNodeB then uses the power measurement to decide whether this UE should be added to a black list or a white list. A UE close to the eNodeB will transmit at a lower transmit power. If the reported UE transmit power is below a predefined threshold level (i.e., UE transmit power<Tx_power_threshold), the UE may be added to a black list since the UE is close to the eNodeB and can be served directly by the eNodeB without repeater assistance. If the UE is reporting PH instead of transmit power, and the UE's reported PH is above a predefined threshold level (i.e., UE PH>PH_threshold), the UE is again operating at a relatively low power level. Therefore, the UE may be added to a black list since the UE is close to the eNodeB and can be served directly by the eNodeB without repeater assistance. Conversely, when the UE is operating at a relatively high power level, as determined by the reported UE transmit power or UE PH, the eNodeB may place the UE on a white list.

A black/white list may also be created as a function of the ratio of UE transmitted bit rate to the UE transmitted power. When a UE is close to the eNodeB, the UE will require lower transmit power for the same bit rate. Therefore, if the ratio of UE transmitted bit rate to the UE transmitted power is above a predefined threshold, the eNodeB may add the UE to the back list.

In other embodiments, the eNodeB may create the black/white lists using combinations of the methodologies described above.

Once the black/white list is created, the eNodeB signals the list to the eNodeR via the eNodeB-eNodeR interface such as the Un interface. In one embodiment, the eNodeB may broadcast the black/white list to all its eNodeRs through common signaling. This is particularly useful whenever there is a common white list for all eNodeRs. Signaling overheads on broadcast channels should be kept low. Therefore, the shorter of the black and white lists is preferably broadcast together with an ID (for example, 1 bit) to indicate whether the list is a white list or a black list.

Alternatively, the eNodeB may create and maintain a number of black lists or white lists. This means the eNodeB maintains repeater-specific lists or a list for a group of eNodeR. For example, the embodiment in which the lists are created based on the DoA of signals facilitates the creation of a repeater-specific list. In this case, the lists are not broadcasted but are sent directly to an eNodeR or a group of eNodeRs via dedicated signaling (for an individual eNodeR) or multicast signaling (for a group of eNodeRs).

The eNodeB transmits the list (black list or white list) to the eNodeR via the Un interface or any other suitable interface between the eNodeB and the eNodeR. The Un interface may include a fixed line such as a fiber optic line or a wireless communication channel.

The behavior of the eNodeR may be controlled purely by the black/white list received from the eNodeB or by a combination of the black/white list and other factors. In one embodiment, the behavior of the eNodeR is controlled purely by a black list provided by the eNodeB. In this embodiment, the eNodeR does not amplify the RBs scheduled for UEs on the black list since these UEs can be adequately served by the eNodeB directly. The eNodeR may, however, amplify RBs scheduled for non-black list UEs.

In another embodiment, the behavior of the eNodeR is controlled purely by a white list provided by the eNodeB. In this embodiment, the eNodeR amplifies the RBs scheduled for UEs on the white list, but does not amplify RBs scheduled for non-white list UEs.

In another embodiment, the behavior of the eNodeR is controlled by a combination of the black/white list and a repeater autonomous algorithm. In this embodiment, once again, the eNodeR does not amplify RBs scheduled for black list UEs. For white list UEs, the eNodeR may or may not amplify the RBs scheduled for a given white list UE ($UE_i$) depending on the outcome of the eNodeR's autonomous algorithm. The eNodeR autonomous algorithm may utilize one or more of the following methods to decide whether the eNodeR should amplify the RBs scheduled for a given white list UE ($UE_i$).

The received signal strength at the eNodeR (or signal quality or combination thereof) is greater than a predefined threshold (i.e., $R_{xr\_i} > RT_{PR}$ where $R_{xr\_i}$ is the received UL signal level or quality from $UE_i$ at the eNodeR). The threshold level $RT_{PR}$ may be configured by the eNodeB via the Un interface or may be selected by the eNodeR autonomously. Alternatively, a default value may be standardized.

The measured RTT/propagation delay between UE and the eNodeR is less than a predefined threshold (i.e., $T_{RTT,UE\_Rep,i} < RT_{RTT,UE\_Rep}$, where $T_{RTT,UE\_Rep,i}$ is the RTT between $UE_i$ and the eNodeR. In one embodiment, the RTT may be normalized to the RTT between the eNodeR and the eNodeB. Alternatively, the same principle can be applied to the propagation time between the eNodeR and the UE.

The threshold level ($RT_{RTT,UE\_Rep}$) may be configured by the eNodeB via the X3 interface or may be selected by the eNodeR autonomously. Alternatively the threshold may be a standardized value.

In the two embodiments above in which the eNodeR autonomously decides whether to amplify a white listed UE based on received signal strength or RTT, a situation may arise that none of the eNodeRs amplify the RBs scheduled for a particular white listed UE. This may occur because the UE does not require amplification. On the other hand, the UE may require amplification but due to reasons such as inappropriate threshold levels used at the eNodeR, the UE is not amplified. Thus, it is desirable for each eNodeR to signal the eNodeB with the identifiers of any white listed UEs that are not amplified by the eNodeR. Alternatively, the eNodeR may signal the eNodeB with the identifiers of any white listed UEs that are not amplified by the eNodeR over a certain time period ($T_o$) or in the last N transmissions. All these parameters may be configured at the eNodeRs by the eNodeB.

Based on the feedback from the eNodeRs, the eNodeB may deduce that none of the eNodeRs has amplified the RBs scheduled for a particular white listed UE. In this case, the eNodeB may conclude that the particular UE was incorrectly placed on the white list, and may move the UE to a black list. Alternatively, the eNodeB may direct one of the eNodeRs (for example, the best eNodeR based on a suitable criterion such as DoA) to amplify the RBs scheduled for the particular white listed UE.

Figure 3:
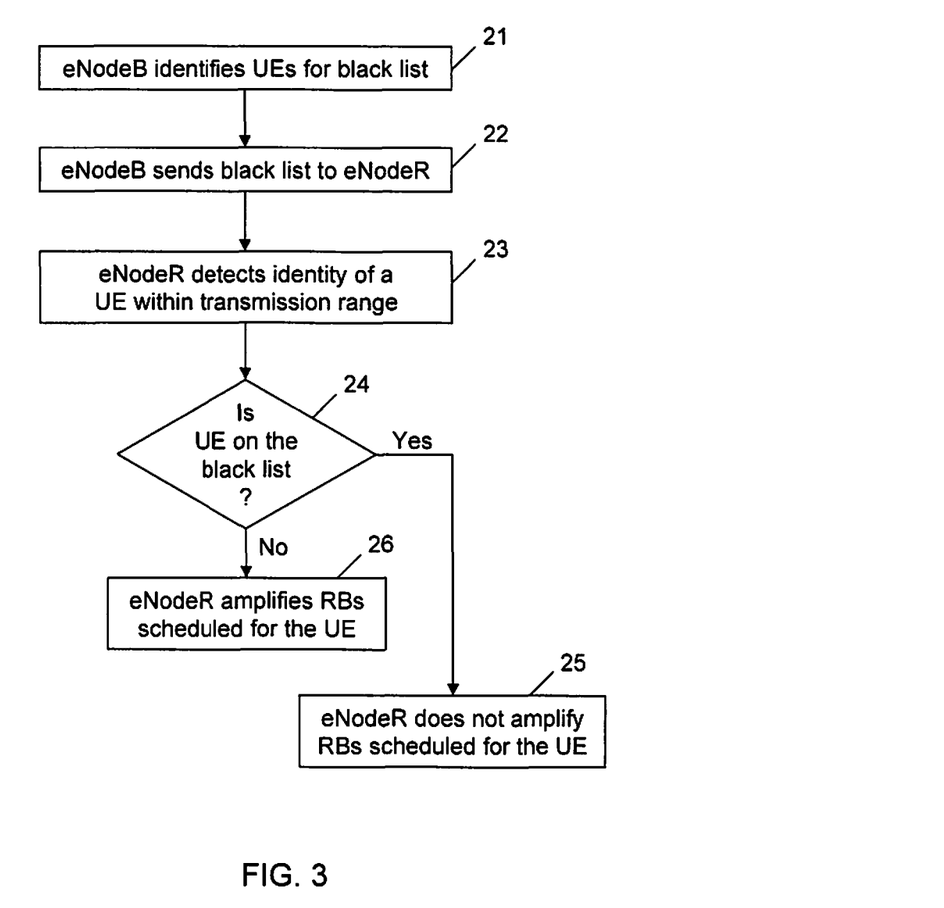
FIG. 3 is a flow chart of the steps of a first exemplary embodiment of the method of the present invention.

FIG. 3 is a flow chart of the steps of a first exemplary embodiment of the method of the present invention. At step 21, an eNodeB identifies UEs for a black list. At step 22, the eNodeB sends the black list to at least one eNodeR. Subsequently, at step 23, the eNodeR detects the identity of a UE within the eNodeR's transmission range. At step 24, the eNodeR determines whether the UE is on the black list. If the UE is on the black list, the method moves to step 25, where the eNodeR does not amplify RBs scheduled for this UE. However, if the UE is not on the black list, the method moves to step 26 where the eNodeR amplifies RBs scheduled for the UE.

Figure 4:
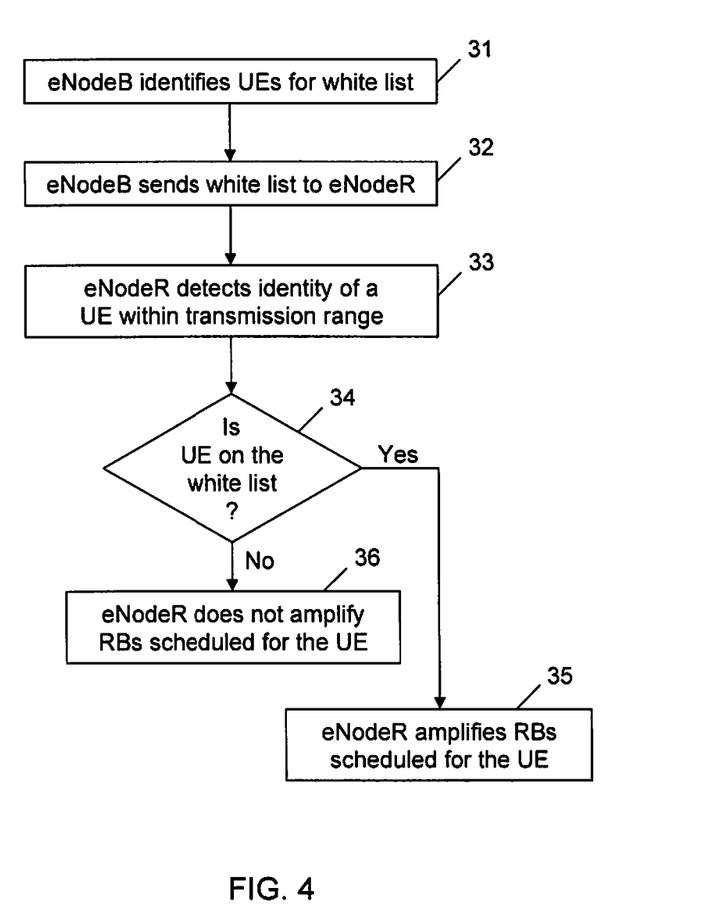
FIG. 4 is a flow chart of the steps of a second exemplary embodiment of the method of the present invention.

FIG. 4 is a flow chart of the steps of a second exemplary embodiment of the method of the present invention. At step 31, an eNodeB identifies UEs for a white list. At step 32, the eNodeB sends the white list to at least one eNodeR. Subsequently, at step 33, the eNodeR detects the identity of a UE within the eNodeR's transmission range. At step 34, the eNodeR determines whether the UE is on the white list. If the UE is on the white list, the method moves to step 35, where the eNodeR amplifies RBs scheduled for the UE. However, if the UE is not on the white list, the method moves to step 36 where the eNodeR does not amplify RBs scheduled for this UE.

Figure 5:
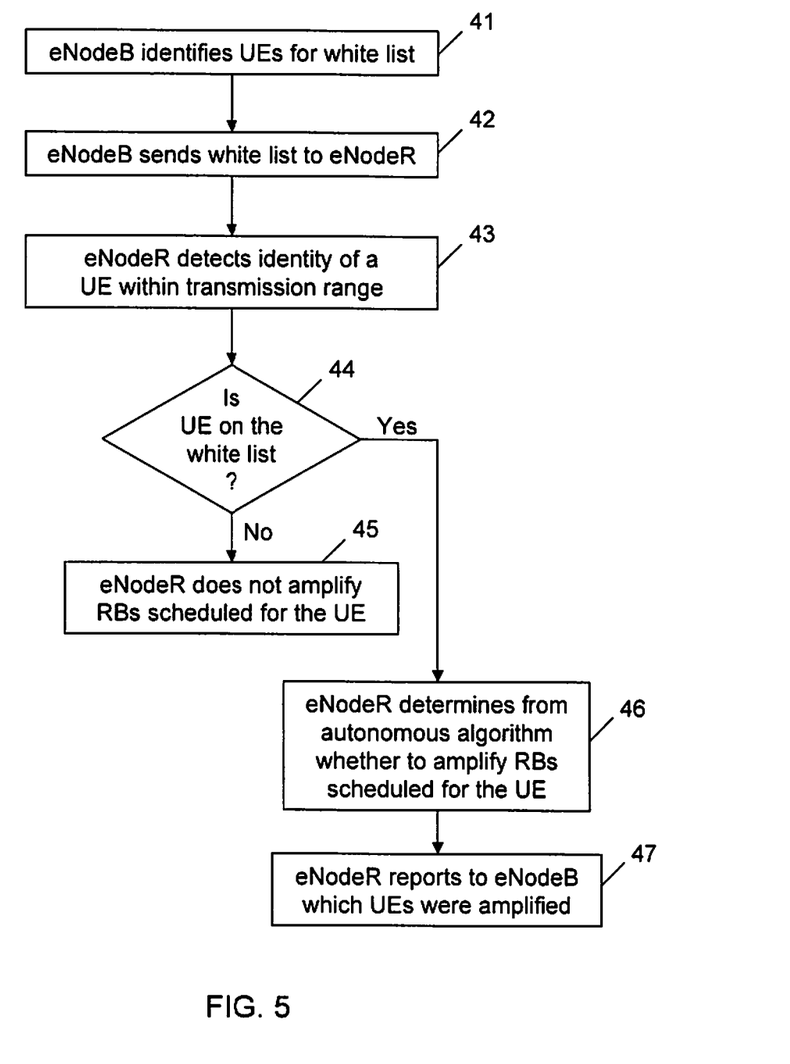
FIG. 5 is a flow chart of the steps of a third exemplary embodiment of the method of the present invention.

FIG. 5 is a flow chart of the steps of a third exemplary embodiment of the method of the present invention. At step 41, an eNodeB identifies UEs for a white list. At step 42, the eNodeB sends the white list to at least one eNodeR. Subsequently, at step 43, the eNodeR detects the identity of a UE within the eNodeR's transmission range. At step 44, the eNodeR determines whether the UE is on the white list. If the UE is not on the white list, the method moves to step 45 where the eNodeR does not amplify RBs scheduled for this UE. However, if the UE is on the white list, the method moves to step 46, where the eNodeR determines from an autonomous algorithm whether to amplify RBs scheduled for the UE. The algorithm may be based, for example, on the measured signal strength from the UE at the eNodeR or on the measured RTT/propagation delay between UE and the eNodeR as described above. At step 47, the eNodeR reports to the eNodeB which UEs were amplified. If a white listed UE was not amplified, the eNodeB may take corrective action.

Figure 6:
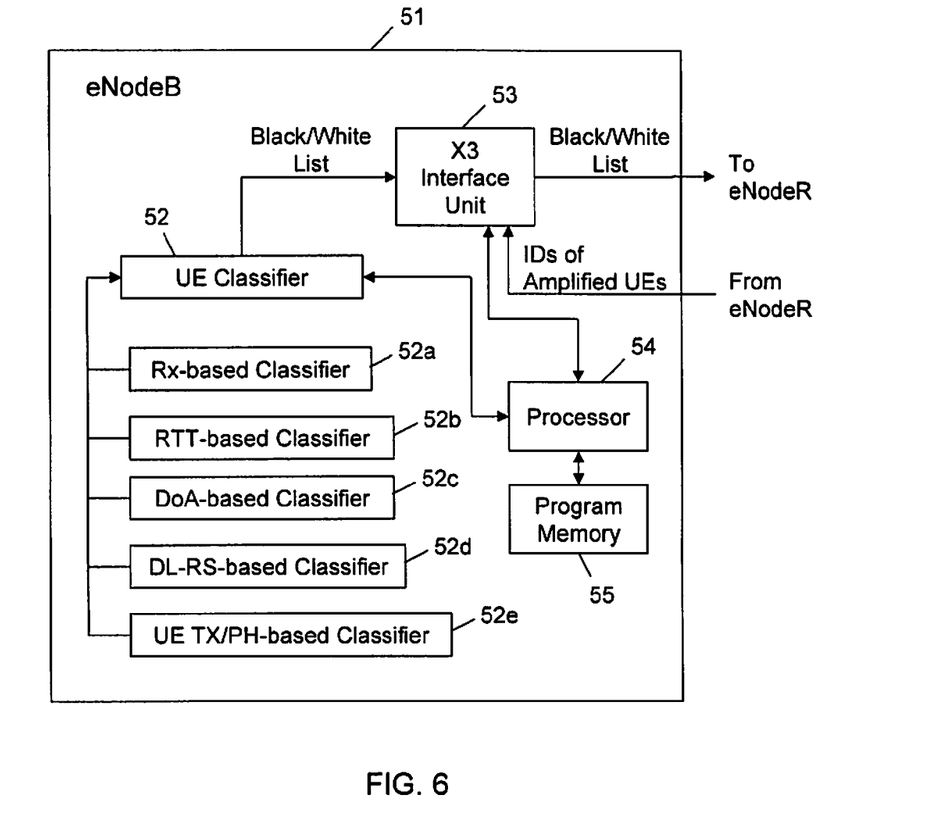
FIG. 6 is a simplified block diagram of an eNodeB modified in accordance with the teachings of the present invention.

FIG. 6 is a simplified block diagram of an eNodeB 51 modified in accordance with the teachings of the present invention. A UE Classifier 52 classifies UEs for either a black list or a white list. As described above, the classification may be based on different factors. Thus, the UE Classifier is illustrated as having inputs from an Rx-based Classifier 52a, an RTT-based Classifier 52b, a DoA-based Classifier 52c, a DL-RS-based Classifier 52d, and a UE TX/PH-based Classifier 52e. The UE Classifier may decide classifications based on one or a combination of inputs.

The UE Classifier 52 sends the black/white list to an Un interface unit 53, which transmits the black/white list to at least one eNodeR. For the white list UEs, the eNodeR may use an autonomous algorithm to determine whether to amplify RBs scheduled for those UEs. The eNodeR then reports the IDs of the amplified UEs to the eNodeB through the Un interface unit. Alternatively the eNodeR reports the IDs of the non-amplified UEs to the eNodeB. The operations of the eNodeB 51 may be controlled by a processor 54 running computer software programs stored on a program memory 55. If a white listed UE was not amplified by the eNodeR, the eNodeB may take corrective action. For example, the processor may cause the UE Classifier 52 to reclassify the UE as a black list UE, or may send an instruction through the Un interface unit 53 instructing the eNodeR to amplify the RBs scheduled for the white listed UE.

Figure 7:
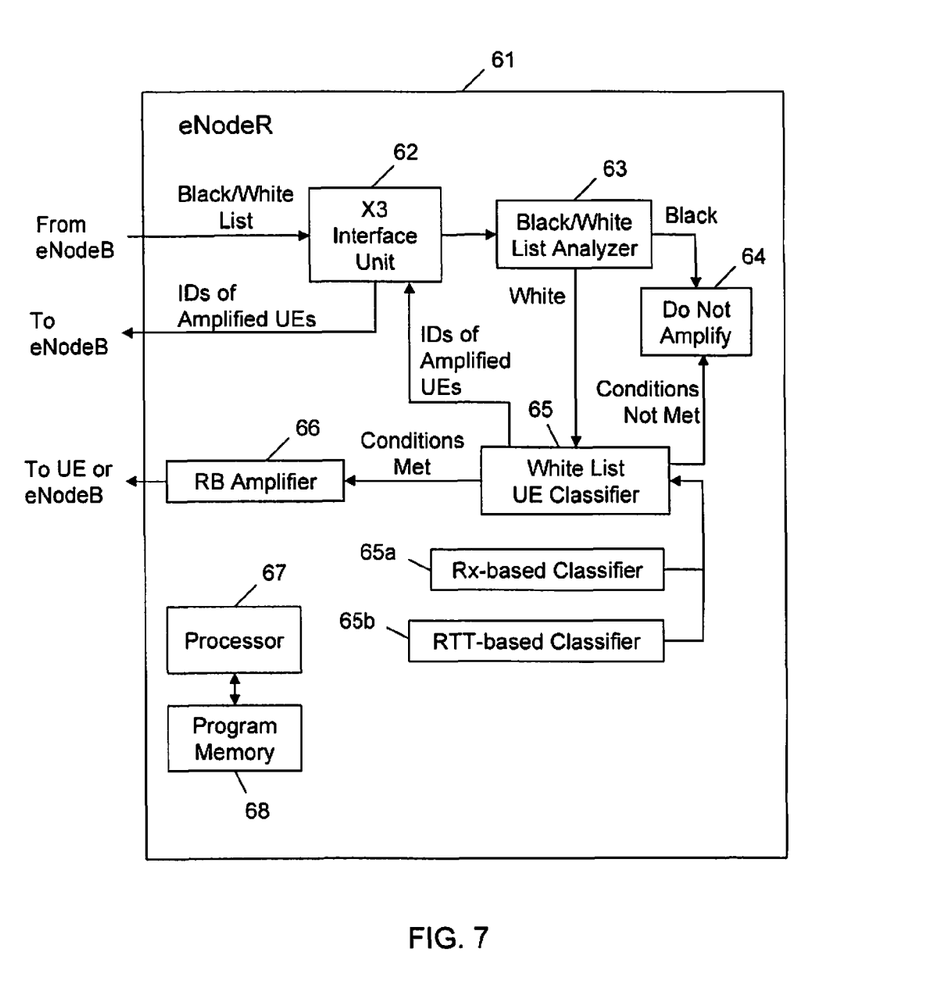
FIG. 7 is a simplified block diagram of an eNodeR modified in accordance with the teachings of the present invention.

FIG. 7 is a simplified block diagram of an eNodeR 61 modified in accordance with the teachings of the present invention. An X3 interface unit 62 receives the black/white list from the eNodeB 51 and sends it to a black/white list analyzer 63 to determine whether the list is a black list or a white list based, for example, on an identifier added by the eNodeB. If the list is a black list, an instruction 64 is generated instructing the eNodeR not to amplify RBs scheduled for UEs on the list. If the list is a white list, the list is provided to a White List UE Classifier 65, which determines which of the UEs on the white list should be amplified. As described above, the classification may be based on different factors. Thus, the White List UE Classifier is illustrated as having inputs from an Rx-based Classifier 65a and/or an RTT-based Classifier 65b. If the conditions for amplification are met for a particular UE, the White List UE Classifier notifies an RB Amplifier 66, which sends amplified RBs to the particular UE (on the downlink from the eNodeB) or to the eNodeB (on the uplink from the UE). The White List UE Classifier then reports the IDs of the amplified UEs to the eNodeB 51 through the X3 interface unit 62. Alternatively the White List UE Classifier reports the IDs of the non-amplified UEs to the eNodeB 51. The operations of the eNodeR 61 may be controlled by a processor 67 running computer software programs stored on a program memory 68.

The foregoing description shows how the present invention reduces signaling overhead compared to the conventional signaling between the eNodeB, repeaters, and the UEs. In addition, overall interference is reduced since appropriate UE-repeater association enables the repeater to amplify only the signals from the most relevant UEs.

The present invention is applicable to both uplink and downlink signaling. In the uplink direction the eNodeR amplifies the power of the RBs transmitted by the UEs in the uplink, while in the downlink direction the eNodeR amplifies the power of the RBs transmitted by the eNodeB in the downlink. This includes the scheduling information sent to the UE on the DL control channel (e.g., PDCCH) in LTE.

The invention is particularly beneficial in the UL because UL coverage is worse than the DL counterpart. Additionally, the invention is easier to implement in the UL since it is easier to implement fast RB switching on/off in the UL where the UE-eNodeR association is a precondition. This is, however, because there are no common signals in the UL, and there is enough time (4 ms) between receiving the UL scheduling information and starting the actual UL transmission. Therefore, fast RB switching on/off may be realized by reading scheduling information (e.g., on PDCCH) which is sent on the DL, and performing switching on and off of UL RBs, which is done in the digital domain.

It should be understood that the described functionalities of the eNodeB and eNodeR may be implemented by hardware, firmware, and/or by software program instructions stored on a program memory and run on a processor.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of supporting frequency-selective repeaters in a wireless telecommunication system having a base station that serves a plurality of User Equipment (UEs) and one or more frequency-selective repeaters that amplify and forward signals between the base station and a portion of the UEs, said method comprising the steps of:
   receiving, at a repeater, a list transmitted by a base station, wherein the list comprises a white list that identifies a subset of a plurality of UEs served by the base station, and wherein the identified subset of UEs comprises UEs for which the repeater is allowed to amplify signals;
   detecting, by the repeater, an identity of a UE within the repeater's transmission range;
   determining whether signals scheduled for the detected UE are to be amplified based on the list;
   amplifying at least a portion of signals received by the repeater in accordance with the determination;
   sending a report to the base station indicating an identity of a first UE identified by the white list for which the repeater did not amplify signals; and
   in response to the report, receiving information from the base station instructing the repeater to re-classify the first UE for inclusion in a black list, wherein the black list identifies UEs for which the repeater is not to amplify signals.

2. The method according to claim 1, further comprising identifying, by the base station, UEs to be included in the white list and placing a UE on the white list when at least one of the following criteria is met:
   an uplink received signal strength level of a signal from the UE measured at the base station is less than a predefined uplink signal strength threshold;
   a round trip time (RTT) of a signal from the base station to the UE and back is greater than a predefined RTT threshold;
   an estimated direction of arrival (DoA) of a signal from the UE received at the base station indicates the UE is operating in a direction from the base station toward a known position of the repeater;
   a downlink received signal strength level of a signal from the base station measured at the UE and reported to the base station is less than a predefined downlink signal strength threshold;
   a received signal strength level of a reference signal from the repeater measured at the UE and reported to the base station is greater than a predefined signal strength threshold;
   a transmit power of the UE reported to the base station is greater than a predefined power threshold; and
   a power headroom of the UE reported to the base station is less than a predefined power headroom threshold, where the UE power headroom is the difference between the UE maximum output power and the UE transmitted or estimated power.

3. The method according to claim 1, wherein determining whether signals scheduled for the detected UE are to be amplified based on the list includes always amplifying signals scheduled for the UE when the UE is on the white list.

4. The method according to claim 1, wherein determining whether signals scheduled for the detected UE are to be amplified based on the list includes amplifying signals scheduled for the UE when the UE is on the white list and a signal quality measurement for the UE, as measured at the repeater, exceeds a predefined threshold level.

5. The method according to claim 4, wherein the step of amplifying signals scheduled for the UE when the signal quality measurement for the UE exceeds a predefined threshold level includes amplifying signals scheduled for the UE when a received signal strength or error rate meets predefined criteria.

6. The method according to claim 1, wherein determining whether signals scheduled for the detected UE are to be amplified based on the list includes amplifying signals scheduled for the UE when the UE is on the white list and a round trip time for a signal between the UE and the repeater is less than a predefined value.

7. The method according to claim 1, wherein the wireless telecommunication system includes a plurality of frequency-selective repeaters at different locations, and the method further comprises creating by the base station, a different list for each of at least two of the plurality of repeaters.

8. The method according to claim 1, wherein receiving information from the base station instructing the repeater not to amplify signals qof the first UE comprises:
    receiving information instructing the repeater to re-classify the first UE for inclusion in a black list, wherein the black list identifies UEs for which the repeater is not to amplify signals.

9. A base station for supporting repeaters in a wireless telecommunication system, wherein the base station is capable of serving a plurality of User Equipment (UEs) and the repeaters are capable of amplifying and forwarding signals between the base station and a portion of the UEs, said base station comprising:
    a UE classifier configured to generate a white list for a first repeater that identifies a subset of a plurality of served UEs, and wherein the identified subset of UEs comprises UEs for which the first repeater is allowed to amplify signals;
    an interface unit configured to to:
        notify the repeater of the identified UEs; and
        receive a report from the first repeater indicating an identify of a first UE identified by the white list for which the first repeater did not amplify signals; and
    a processor configured to:
        analyze the received report and determine whether the first repeater failed to amplify the signal for the first UE; and
        in response to determining that the first repeater failed to amplify the signal for the first UE, cause the UE classifier to re-classify the first UE for inclusion in a black list, wherein the black list identifies UEs for which the first repeater is not to amplify signals.

10. The base station of claim 9, wherein the UE classifier is further configured to place identified UEs on a list that either identifies UEs for which signals are not to be amplified by the repeater or that identifies UEs for which signals are allowed to be amplified by the repeater, wherein the UE classifier is further configured to consider at least one of the following criteria when identifying UEs for the list:
    an uplink received signal strength level of a signal from the UE measured at the base station;
    a round trip time (RTT) of a signal from the base station to the UE and back;
    an estimated direction of arrival (DoA) of a signal from the UE received at the base station;
    a downlink received signal strength level of a signal from the base station measured at the UE and reported to the base station;
    a received signal strength level of a reference signal from the repeater measured at the UE and reported to the base station;
    a transmit power of the UE reported to the base station; and
    a power headroom of the UE reported to the base station.

11. The base station according to claim 10, wherein the wireless telecommunication system includes a plurality of repeaters at different locations, and the UE classifier is further configured to create a different list for each repeater.

12. A repeater for amplifying and forwarding signals between a base station and a plurality of User Equipment (UEs) served by the base station, said repeater comprising:
    an interface unit configured to receive a list of UEs from the base station wherein the list comprises a white list that identifies a subset of a plurality of UEs served by the base station, and wherein the identified subset of UEs comprises UEs for which the repeater is allowed to amplify signals; and
    a list analyzer and/or a UE classifier configured to determine whether or not signals scheduled for a first UE are to be amplified based on the list and to instruct an amplifier whether or not to amplify signals for the UE based on the determination;
    the amplifier configured to amplify and forward signals in accordance with instructions from the list analyzer and/or the UE classifier only to UEs identified by the received list; and
    a processor configured to send a report to the base station indicating an identity of a first UE identified by the white list for which the repeater did not amplify signals, wherein the interface unit is further configured to receive information from the base station instructing the repeater not to amplify signals of the first UE in response to the report, and wherein the list analyzer and/or the UE classifier is configured to re-classify the first UE for inclusion in a black list, wherein the black list identifies UEs for which the first repeater is not to amplify signals.

13. The repeater according to claim 12, wherein the repeater includes:
    a list analyzer configured to determine whether the received list is a black list that identifies UEs for which signals are not to be amplified by the repeater or a white list that identifies UEs for which signals are allowed to be amplified by the repeater; and
    a UE classifier configured to determine which white list UEs should have their signals amplified.

14. The repeater according to claim 12, and wherein the UE classifier is further configured to determine that signals scheduled for a first UE are to be amplified when the first UE is included in the white list and a signal quality measurement for the UE, as measured at the repeater, exceeds a predefined threshold level.

15. The repeater according to claim 12, and wherein the UE classifier is further configured to determine that signals scheduled for a first UE are to be amplified when the first UE is included in the white list and a round trip time for a signal between the UE and the repeater is less than a predefined value.

* * * * *

UNITED STATES PATENT AND TRADEMARK OFFICE
CERTIFICATE OF CORRECTION

PATENT NO. : 8,654,701 B2  Page 1 of 1
APPLICATION NO. : 12/580340
DATED : February 18, 2014
INVENTOR(S) : Kazmi et al.

It is certified that error appears in the above-identified patent and that said Letters Patent is hereby corrected as shown below:

On the title page, in the Figure, for Tag "62", in Line 1, delete "X3" and insert -- Un --, therefor.

In the Drawings

In Fig. 6, Sheet 5 of 6, for Tag "53", in Line 1, delete "X3" and insert -- Un --, therefor.

In Fig. 7, Sheet 6 of 6, for Tag "62", in Line 1, delete "X3" and insert -- Un --, therefor.

In the Specification

In Column 1, Line 34, delete "UMTS" and insert -- UMTS Terrestrial --, therefor.

In Column 3, Line 61, delete "ending" and insert -- sending --, therefor.

In Column 4, Line 16, delete "repeater" and insert -- repeater. --, therefor.

In Column 4, Line 33, delete "DRAWING" and insert -- DRAWINGS --, therefor.

In Column 6, Line 43, delete "back list." and insert -- black list. --, therefor.

In Column 7, Line 32, delete "UE;" and insert -- $UE_i$ --, therefor.

In the Claims

In Column 11, Line 19, in Claim 8, delete "qof" and insert -- of --, therefor.

In Column 11, Line 35, in Claim 9, delete "to to:" and insert -- to: --, therefor.

In Column 11, Line 38, in Claim 9, delete "identify" and insert -- identity --, therefor.

Signed and Sealed this
Ninth Day of September, 2014

Michelle K. Lee
*Deputy Director of the United States Patent and Trademark Office*